Sept. 28, 1965   P. A. LIVERA   3,208,601
INSERTING CONVEYOR
Filed Oct. 16, 1963
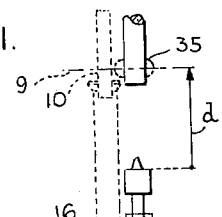
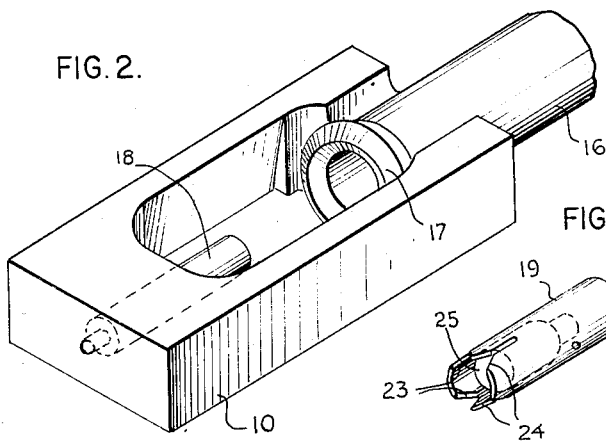
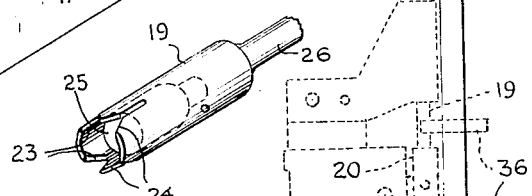
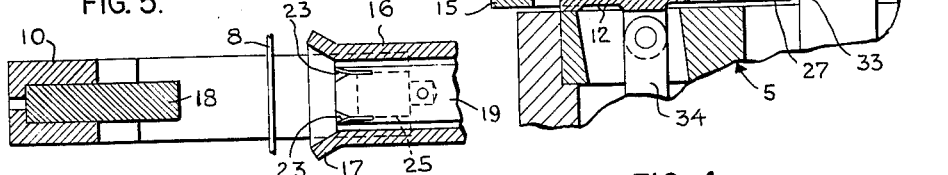
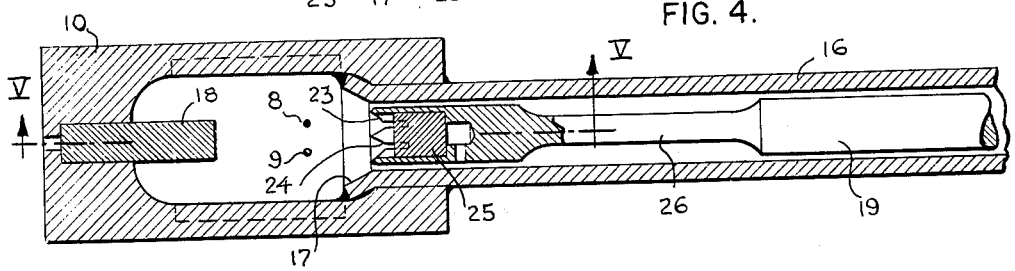
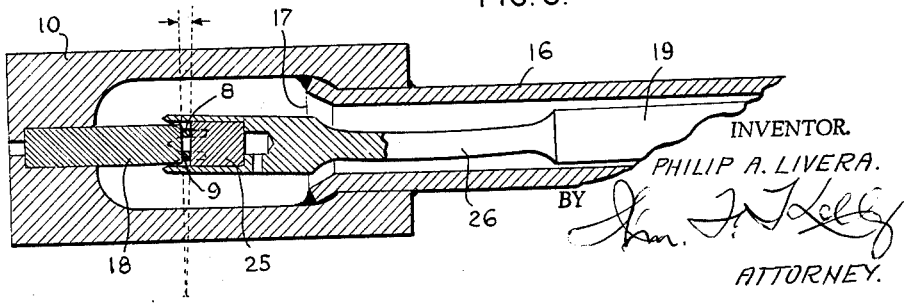
INVENTOR.
PHILIP A. LIVERA.
BY
ATTORNEY.

United States Patent Office
3,208,601
Patented Sept. 28, 1965

3,208,601
INSERTING CONVEYOR
Phillip A. Livera, Bloomfield, N.J., assignor to Westinghouse Electric Corporation, Pittsburgh, Pa., a corporation of Pennsylvania
Filed Oct. 16, 1963, Ser. No. 316,564
8 Claims. (Cl. 214—1)

The present invention relates to a support-wire inserting machine and more particularly to an inserting conveyor therefor operable to transport a plurality of preformed support wires from a receiving position to a dispensing position where such wires are inserted into the glass button formed on the arbor of a lamp stem.

Devices of this general nature are known to the art with a somewhat analogous type being disclosed in U.S. Patent No. 2,968,479, granted January 17, 1961, to Carl Lenz et al., and assigned to the same assignee as the present invention. However, the conveyor therein described is subject to several disadvantageous features, the principal ones of which are its costs and relatively short useful life. For example, the finger and wire clamp assembly are subject to frequent breakage necessitating shut-down of the machine for appreciable time periods for repairs. Moreover, the finger and wire clamp assembly are quite costly because of the necessity for accurate machining and assembling since they are nonadjustable once assembled.

It is accordingly the primary object of the present invention to provide an inserting conveyor for transporting support wires on a support-wire inserting machine wherein such conveyor is economical to manufacture and possesses a long useful life.

Another object of the present invention is the provision of an inserting conveyor for support wires which requires very little maintenance yet is automatically adjustable thus imparting a long useful life thereto.

The aforesaid objects of the present invention, together with other objects which will become obvious from the following description, are accomplished by the provision of an inserting conveyor for a support-wire inserting machine in which a tubular support is utilized having a substantially U-shaped end with a carbide surface thus forming an anvil. A reciprocally movable hammer is disposed interiorly of the tubular support with a slight clearance therebetween and with such hammer likewise having a carbide tipped surface. This hammer is also provided with a section near its outer end of reduced cross-sectional area which together with the clearance between the tubular support and the diameter of the hammer allows the latter to flex and thus compensate for support-wires of varying diameter.

For a better understanding of the present invention reference may be had to the accompanying drawing showing one form which such invention may take and wherein:

FIGURE 1 is a fragmentary side elevational view partly in section of the improved inserting conveyor of the present invention in the open support-wire receiving position on an inserting turret and with the closed vertical dispensing position thereof shown in dotted lines, FIG. 2 is an enlarged perspective view of the substantially U-shaped end of the tubular support with its carbide surface and forming an anvil, FIG. 3 is an enlarged fragmentary perspective view of the hammer end with its support wire receiving notches, FIG. 4 is an enlarged cross-sectional view taken on the line IV—IV of FIG. 1 and showing the inserting conveyor in its open position, FIG. 5 is a cross-sectional view taken on the line V—V of FIG. 4, and FIG. 6 is a cross-sectional view identical to FIG. 4 but showing the inserting conveyor in its closed support-wire dispensing position.

Referring now more specifically to the accompanying drawing, the inserting turret 5 is therein shown provided with the present inserting conveyor 6 pivoted thereto on a shaft 7 and in its horizontal support-wire receiving position in which the support-wires 8 and 9 pass through the open substantially U-shaped anvil end 10 and are thus perpendicular to the axis of the inserting conveyor, as seen in FIGS. 1, 4 and 5. The inserting conveyor 6 comprises a base plate 12 provided with a slide 13 movable thereon under the influence of a spring 14 as hereinafter more fully explained. An angular bracket 15 extends generally upward from this slide 13 and in turn carries a horizontally disposed tubular support 16 secured thereto. As shown by the enlarged view in FIG. 2, this tubular support 16 carries a flared and tapered collar 17 which secures the U-shaped anvil 10 to the end of such tubular support 16. Also, as seen in the several figures, the base end of this U-shaped anvil 10 has a hardened metallic projection, such as a carbide rod 18, or the like, coaxially disposed relative to the tubular support 16.

An elongated hammer 19 is concentrically disposed interiorly of the tubular support 16 and in order to reciprocate such hammer therein its outer end is provided with a collar 20 pivotally connected to one end of a rocker arm 22 carried by the base plate 12 and with the other end of such rocker arm 22 pivotally connected to the slide 13. The inner end of this elongated hammer 19, as seen in the several figures, is provided with a pair of outwardly flaring notches 23 and 24 disposed perpendicular to the axis of such hammer and thus parallel to the inserted support-wires 8 and 9, so that the latter are guided into such notches and against a hardened metallic surface, such as a carbide end insert 25, of the elongated hammer 19 when it is reciprocated toward the anvil rod 18. It will also be noted by reference particularly to FIGS. 3, 4 and 6 that such elongated hammer 19 near its inner end is provided with a section 26 of reduced diameter to impart a slight degree of flexibility thereto. In addition, the diameter of the inner extremity of such hammer 19 is somewhat less than that of the tubular support 16 to provide sufficient spacing to allow free movement therebetween as well as this slight flexing of the hammer end and thus compensate for differences in the diameter between the support-wires 8 and 9 without a decrease in gripping pressure, as can be appreciated from FIG. 6.

The inserting conveyor 6 is normally held in its horizontal support-wire receiving position, as shown in FIG. 1, by a pawl 27 pivotally secured to the base plate 12 and having the other end of the coil spring 14 extending from slide 13 connected thereto. Such pawl 27 normally engages a notch 28 within a recess 29 on the underside of the underside of the slide 13 which holds the latter and hence the inserting conveyor 6 in its support-wire receiving position, with the coil spring 14 thus expanded. At this time the support wires 8 and 9 are inserted through the anvil 10 in position to be servered to the proper length by the cutomary cutting means 30, as shown in FIG. 1. Therafter, upon raising of the usual button-forming plunger 32 a shoulder 33 t hereon contacts one end of the pawl 27 causing counterclockwise rotation thereof about its pivotal connection with base plate 12, allowing the potential enregy of spring 14 to cause suddent horizontal movement of slide 13 to the right as viewed in FIG. 1, until the pawl 27 then engages the edge of recess 29 to prevent shock damage to the support wires 8 and 9.

Such initial movement of side 13 carries with it similar horizontal movement of the tubular support 16 and anvil 10 thus positioning the anvil rod 18 closely adjacent to the support wires 8 and 9. Simultaneously with movement of the tubular support 16 to the right along with the slide 13, the elongated hammer 19 is moved to the left, as viewed in FIG. 1, due to slide 13 causing counterclockwise rotation of rocker arm 22 which thus moves the outwardly flaring notches 23 and 24 of the hammer end about the respective vertically disposed support wires 8 and 9. Continued upward movement of the shoulder 33 on button-forming plunger 32 causes still further rotation of pawl 27 and disengagement thereof with the edge of recess 29. Such disengagement enables the slide 13 and tubular support 16 to complete their remaining short travel to the right along with shorter and complete movement of elongated hammer 19 to the left thus forcing the support wires 8 and 9 completely into the slots 23 and 24 where they are firmly gripped between the end of anvil rod 18 and hammer-end insert 25. Moreover, any difference in diameter size between the support wires 8 and 9 is compensated for by flexing of the elongated hammer at its reduced diameter section 26 and although the abutting faces of the anvil rod 18 and hammer-end insert 25 thus are angulated relative to each other, nevertheless both support wires 8 and 9 are firmly gripped therebetween as shown on a somewhat exaggerated scale in FIG. 6.

Following the firm gripping of the support wires 8 and 9 they are then severed by the cutter 30 followed by upward movement of the pivoted link 34. This causes the base plate 12, carrying the slide 13 and inserting conveyor 6 to swing upwardly about its pivotal connection with the inserting machine shaft 7, into its dispensing position, as shown by the dotted lines in FIG. 1. By this time the plunger 32 will have completed its upper travel the distance d (FIG. 1) and formed the plasticized button 35 on an arbor for an electric lamp so that the then horizontally disposed support wires 8 and 9 are readily embedded in such button upon completion of the movement of the inserting conveyor 6 to its dispensing position. Thereupon the plunger 32 is moved downwardly the distance "d" with a collar 36 thereon also moving downwardly from its dotted line position to the full line position in FIG. 1. During such downward movement the collar 36 engages the collar 20 of the inserting conveyor 6 likewise moving the latter downwardly therewith. This downward movement of collar 20 carries with it the elongated hammer 19, thereby releasing its gripping engagement with the then inserted support wires 8 and 9. At the same time the slide 13 is raised by rotation of rocker arm 22, again expanding coil spring 14 and causing the pawl 27 to reengage the notch 28, and conditioning the inserting conveyor 6 for the reception of new support wires. Upon completion of the "recocking" of the inserting conveyor 6 by the downward movement of plunger collar 36, the pivoted link 34 then also moves downwardly causing counterclockwise rotation of base plate 12 about shaft 7 thus returning the inserting conveyor 6 to its support-wire receiving position preparatory to a repetition of its operating cycle.

It should thus become obvious to those skilled in the art that the objects of the present invention have been achieved by the provision of an inserting conveyor which is simple and economical to produce, yet positive and dependable in its operation over a long useful life due to the elimination of moving parts subject to wear and frequent replacement. Also, while the present invention has been shown and described as transporting a pair of support wires such inserting conveyor is equally operable to insert one or more such wires as desired.

Although one specific embodiment of the present invention has been shown and described it is to be understood that still further modifications thereof may be made without departing from the spirit and scope of the appended claims.

I claim:

1. An inserting conveyor for a support wire inserting machine and operable to transport a plurality of support wires from a receiving position to a dispensing position comprising:
   (a) a support position perpendicular to the axis of said support wires when in their receiving position,
   (b) an anvil carried by said support and normally disposed in spaced relation to said support wires when in their initial receiving position,
   (c) an elongated hammer concentrically disposed relative to said support having a reduced flexible section near its free end,
   (d) and means operable to reciprocally move said hammer relative to said support to cause the free end of said hammer to force said support wires into gripping engagement with said anvil and attendant flexing of the free end of said hammer from its reduced section to compensate for any occurring differences in support wire diameters.

2. An inserting conveyor for a support-wire inserting machine and operable to transport a plurality of support wires from a receiving position to a dispensing position comprising:
   (a) a tubular support positioned perpendicular to the axis of said support wires when in their receiving position,
   (b) an anvil carried by said tubular support and normally disposed in spaced relation to said support wires when in their initial receiving position,
   (c) an elongated hammer concentrically disposed relative to said tubular support having a reduced flexible section near its free end,
   (d) means operable to reciprocally move said hammer relative to said tubular support to cause the free end of said hammer to force said support wires into gripping engagement with said anvil and attendant flexing of the free end of said hammer from its reduced section to compensate for any occurring differences in support wire diameters.

3. An inserting conveyor for a support-wire inserting machine and operable to transport a plurality of support wires from a receiving position to a dispensing position comprising:
   (a) a support positioned perpendicular to the axis of said support wires when in their receiving position,
   (b) an anvil carried by said support and provided with a hardened metallic end normally disposed in spaced relation to said support wires when in their initial receiving position,
   (c) an elongated hammer concentrically disposed relative to said support having a hardened metallic surface at its free end together with a reduced flexible section adjacent such end,
   (d) and means operable to reciprocally move said hammer relative to said support to cause the hardened free end of said hammer to force said support wires into gripping engagement with the hardened metallic end of said anvil and attendant flexing of the free end of said hammer from its reduced section to compensate for any occurring differences in support wire diameters.

4. An inserting conveyor for a support-wire inserting machine and operable to transport a plurality of support wires from a receiving position to a dispensing position comprising:
   (a) a tubular support positioned perpendicular to the axis of said support wires when in their receiving position,
   (b) an anvil carried by the end of said tubular support and normally disposed in spaced relation to said support wires when in their initial receiving position,
   (c) an elongated hammer concentrically disposed within said tubular support having a reduced flexible section near its free end,
   (d) and means operable to reciprocally move said hammer within said tubular support to cause the free end of said hammer to force said support wires into gripping engagement with said anvil and attendant flexing of the free end of said hammer from its reduced section to compensate for any occurring differences in support wire diameters.

5. An inserting conveyor for a support-wire inserting machine and operable to transport a plurality of support wires from a receiving position to a dispensing position comprising:
 (a) tubular support positioned perpendicular to the axis of said support wires when in their receiving position,
 (b) an anvil carried by the end of said tubular support and normally confining said support wires when in their initial receiving position,
 (c) a hardened metallic member projecting from said anvil in coaxial alignment with said tubular member,
 (d) an elongated hammer concentrically disposed and freely movable within said tubular support and having a reduced flexible section near its free end,
 (e) slots disposed in the end of said elongated hammer together with a hardened metallic insert at the base of said slots,
 (f) and mean operable to reciprocally move said hammer within said tubular support to cause said support wires to enter said slots in the free end of said hammer and form a gripping engagement between the hardened metallic member of said anvil and the hardened metallic insert of said hammer end, and the gripping of said support wires therebetween causing an attendant flexing of the free end of said hammer from its reduced section to compensate for any occurring differences in support wire diameters.

6. An inserting conveyor for a support-wire inserting machine, said conveyor operable to sequentially retain and transport a plurality of pairs of spaced support wires which can have differing diameters from a receiving position to a dispensing position, said conveyor comprising:
 (a) tubular support means positioned substantially perpendicular to the axis of a pair of said spaced support wires when in their receiving position;
 (b) a generally U-shaped anvil means carried by an end portion of said tubular support means, said pair of spaced support wires projecting through said U-shaped anvil means when in their receiving position;
 (c) a hardened metallic member projecting from said anvil means and toward said tubular support means, said hardened metallic member being substantially coaxial with said tubular support means;
 (d) an elongated hammer means disposed within and reciprocable within said tubular support means, said hammer means having a support wire striking end which is positioned proximate to said anvil means, and a portion of said elongated hammer means which is near to the striking end of said hammer means having a reduced cross section to impart flexibility thereto;
 (e) actuating means for moving said tubular support means and said anvil means carried thereby so that said hardened metallic member is positioned against said pair of support wires, and said actuating means also reciprocating said elongated hammer means withtin said tubular support means so that the wire striking end of said elongated hammer means is forced against said pair of support wires as positioned against said hardened metallic member, with the force exerted on said elongated hammer means sufficient to cause the flexible portion thereof to flex when the individual wires of said pair of support wires have different diameters to thus exert a holding pressure on both wires of said pair of support wires; and
 (f) said retained pair of support wires then being removed by said inserting conveyor from receiving position by dispensing position.

7. The inserting conveyor as specified in claim 6, wherein slots are disposed in said elongated hammer means at the wire striking end thereof, and a hardened metallic insert is carried in said slots to contact said pair of support wires and thus minimize wear on said hammer means.

8. The apparatus substantially as hereinbefore described with references to and as illustrated in the accompanying drawings.

References Cited by the Examiner

UNITED STATES PATENTS 2,201,159 5/40 Clow.
2,623,080 12/52 Young _____ 269—254 X
2,968,479 1/61 Lenz _____ 269—254

HUGO O. SCHULZ, *Primary Examiner.*

MARVIN A. CHAMPION, *Examiner.*